Dec. 30, 1930.  R. REYNOLDS  1,786,865
BUMPER FOR MOTOR CARS AND AUTOMOBILES
Filed July 11, 1929  2 Sheets-Sheet 1
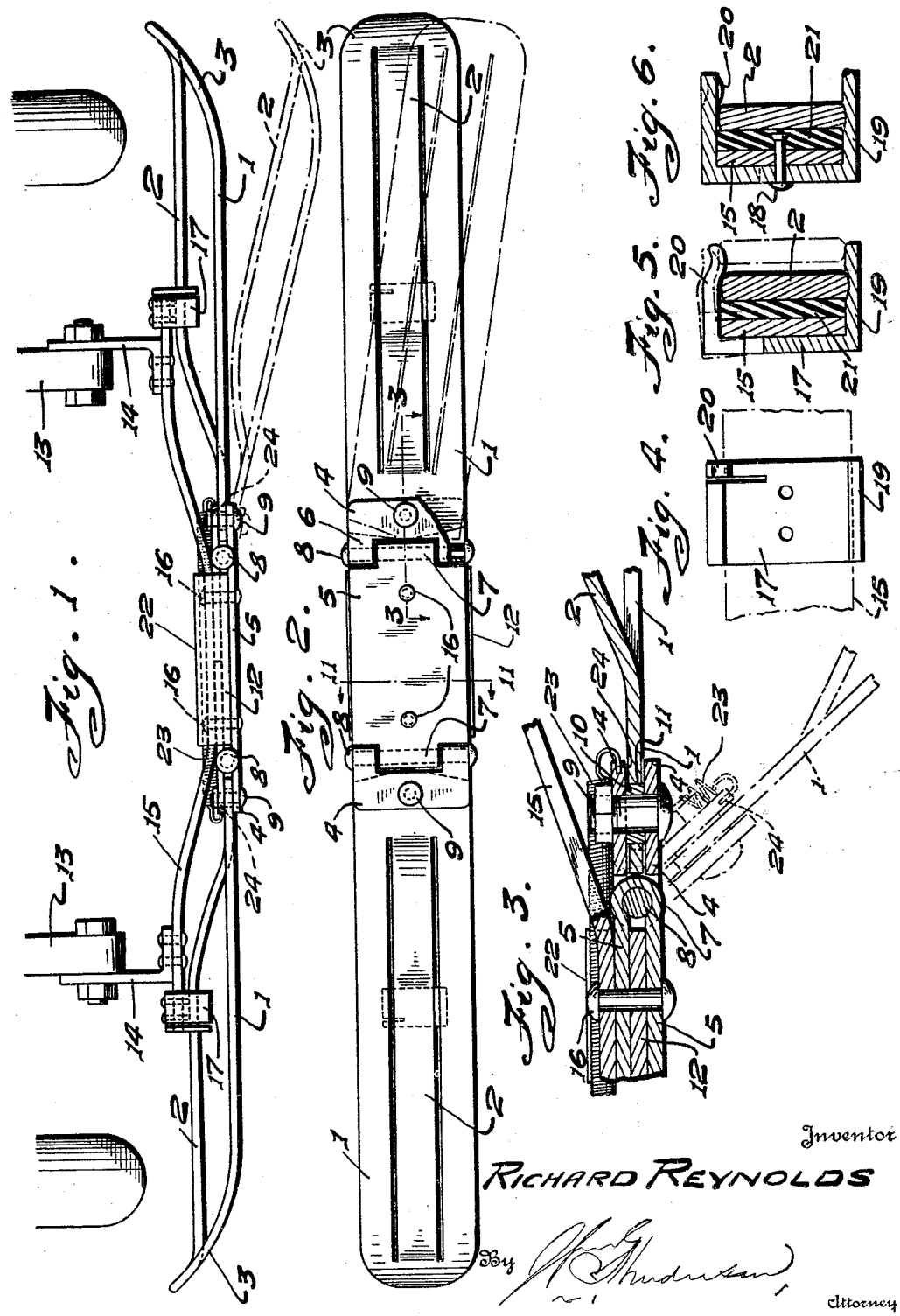
Inventor
RICHARD REYNOLDS
By
Attorney Dec. 30, 1930.  R. REYNOLDS  1,786,865
BUMPER FOR MOTOR CARS AND AUTOMOBILES
Filed July 11, 1929   2 Sheets-Sheet 2
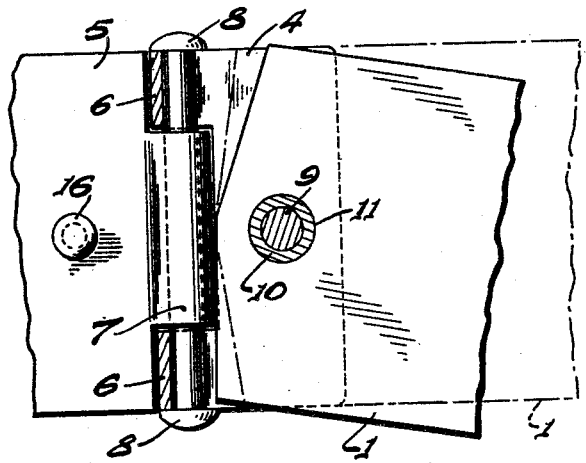
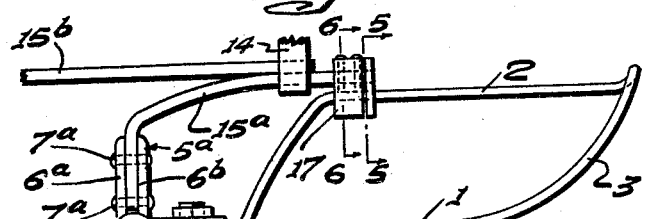
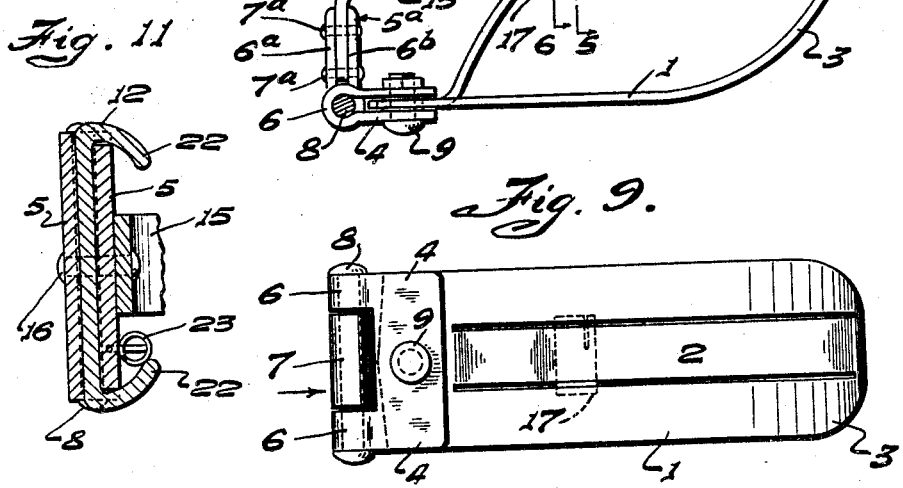
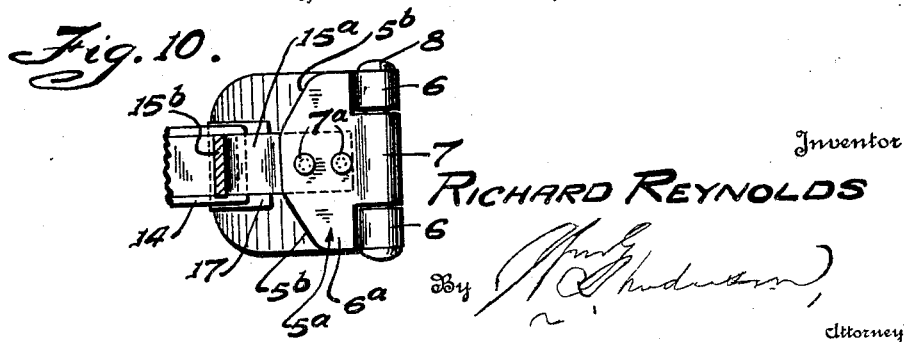
Inventor
RICHARD REYNOLDS
By
Attorney Patented Dec. 30, 1930

1,786,865

UNITED STATES PATENT OFFICE

RICHARD REYNOLDS, OF NASHVILLE, TENNESSEE

BUMPER FOR MOTOR CARS AND AUTOMOBILES

Application filed July 11, 1929. Serial No. 377,558.

This invention relates to bumpers for automobiles or other motor cars. It has for its object primarily to provide for suspending the bumper from its support by a practically universal joint so that it may be moved in either of two different planes to effect an easy disengagement or unlocking of one car from another car caused by one bumping into the other. It has for a further object other improved features of construction as will be hereinafter made to appear. To accomplish the foregoing the invention consists in the features hereinafter particularly described and then sought to be clearly defined by the appended claims reference being had to the accompanying drawings forming a part hereof, and in which Figure 1 is a plan view of a bumper embodying the invention;

Figure 2 is a front elevation of the bumper;

Figure 3 is a section on line 3—3 of Fig. 2;

Figure 4 is a face view of one of the spring slips for sustaining the bumper in normal position;

Figure 5 is a cross section on line 5—5 of Figure 8, through one clip and supporting bar and one leaf of the bumper and interposed elastic cushion;

Figure 6 is a cross section on line 6—6 of the same figure;

Figure 7 is a front elevation, enlarged scale, showing the manner of hinging one wing of the bumper for movement in two different planes;

Figure 8 is a top plan view of one of the bumperettes for the rear of the car;

Figure 9 is a front elevation of the same;

Figure 10 is an end view of the same looking in the direction of the arrow, Figure 9;

Figure 11 is a sectional elevation taken on line 11—11 of Fig. 2.

As illustrated in the drawings the bumper includes a wing member, one or two, consisting of a metallic plate 1, preferably steel, cut or slit longitudinally to form a centrally disposed tongue 2 pressed outwardly from the body portion 1 so as to be spaced therefrom, the two parts 1 and 2 possessing more or less resiliency, and the outer end of the part 1 preferably presenting a curved outline as illustrated at 3. Each wing is connected at its inner end to a hinge which will permit it to be swung in a horizontal plane, the hinge for the front bumper consisting of a leaf member 4 and a leaf member 5, each having an eye 6 and 7, respectively, adapted to receive a bolt or pintle 8 by which the hinging is effected. The end of the member 1 fits between the cheeks of the hinge leaf 4 and is held therein by a pivot pin or bolt 9 which permits the wing to swing in a vertical plane, the two bolts or pins 8 and 9 constituting a swivel for the wing so that the wing may swing in two different planes. The bolt or pivot pin 9 passes through a collar 10 that fits between the two sides of the hinge leaf 4, and in an opening 11 in the end of the wing plate 1 so as to permit the wing to swing in a vertical plane, the collar also serving as a spacer between the two sides of the hinge leaf 4. A spacing member or plate 12 also fits between the sides of the hinge leaf 5. The front bumper is supported from side bars 13 of the chassis frame by suitable brackets 14 and a supporting bar 15 to which the hinge leaf 5 may be attached by bolts or rivets 16 passed through the bar, the hinge leaf and the spacing plate 12 as shown in Figs. 1 and 3. The ends of the supporting bar 15 project beyond the brackets 14 and carry a clip 17 secured by bolts or rivets 18 to the end of the supporting bar. This clip has forwardly extending flanges or lips 19 between which will lie the tongue member 2 of the bumper wing which will be held releasably therein by a spring catch or latch 20 preferably formed by slitting the clip 17 as shown and slightly deflecting the finger thus formed as shown in Figure 5 so that the tongue member 2 of the wing will be held by the spring latch or finger when pressed into position in the clip but being releasable from the clip when pressure is exerted on the tongue member in a direction to draw it out from the clip. A rubber or elastic cushion or pad 21 may be interposed between the tongue member 2 of the wing and the supporting bar 15 and held in place by the bolts 18 so as to cushion the parts and prevent rattling.

The foregoing relates more particularly to the front bumper illustrated in Figures 1 to 6 of the drawings. The same general features and operating in substantially the same manner apply to the rear bumpers of the car illustrated in Figures 7 to 10 of the drawings, the same reference numerals being employed for the corresponding parts. The same form of bumper described for the front of the car can be used for the rear but for the rear it may be preferred to use two bumpers, connected one to the other or not as described although it is preferred to use independently applied bumpers each however having the same general features of construction as in the front bumper and each unit embodying the same features as the units of the front type of bumper with some slight modifications such as will be described. For the rear bumpers as in the front bumpers each will comprise a plate 1 and tongue 2 formed as in the front bumper and hinged at its inner end so as to be swiveled to swing in two different planes. The plate member 1 of the wing will be pivotally connected at its inner end by a bolt or pivot pin 9 to the leaf 4 of the hinge having eyes 6 as in the front bumper and a bolt or pintle 8 will pass through eyes 6 and through eye 7 of the companion hinge leaf 5a. The bar 15a which supports the bumper from the car instead of extending from one bar of the chassis frame to the other bar, has one end inserted between the two cheeks 6a, 6b of the leaf 5a and secured by rivets 7a as shown. The clip 17 is formed and connected to the end of the supporting bar as in the other form and the clip functions as in the other form. In this form as in the other form the end of the wing plate 1 is beveled as shown in both forms so that when the wing swings vertically, its edge will contact with the bolt or pintle that connects the two leaves of the hinge and limit the extent of swing, and if it be downward will prevent contact of the wing with the ground. The edge of one member or cheek of the hinge 5a is cut away on a bevel as shown at 5b in Figure 10 so as to facilitate easy disengagement from an object with which it may become accidentally interlocked. If desired, one bumper may be connected with the other by a cross or brace bar 15b.

In both forms of the invention if the car becomes accidentally interlocked, it can be released from the interlock by driving ahead one car or backing the other car, or otherwise, so as to release the wing from the spring clip 17, whereupon the wing can be swung horizontally or vertically, or both ways, so as to release one car from the other.

It is preferred to have the spacing plate 12 which lies between the leaves of the member 5 formed at top and bottom with rearwardly extending lips 22 which will pass across the sustaining bar 15 and intervening leaf 5 and thence inwardly towards the central portion of bar 5 along the face thereof so that the lips 22 will present curved or inclined faces along which may slide or glide the member of another car that may come into engagement with the lips from a collision or otherwise and thus make it easier to disengage the interengaging parts than would be if the interengaging parts presented angular shoulders to each other.

For the purpose of restoring the bumper wings to substantially normal position instead of standing out or projecting at substantially right angles to normal position after being moved to release the car from interlocking engagement with another car I prefer to provide a spring for restoring the wing to its substantially normal position. This spring may be of any approved type and attached in any suitable manner to perform its function. Preferably it is a coil spring 23 connected at one end by being hooked into an opening or keeper or otherwise attached say to the end of the leaf hinge member 4 as shown at 24, and having the other end similarly connected to the hinged member 4 of the other wing as illustrated, the spring passing from one wing to the other, back of the rearmost leaf member 5, as illustrated. It follows that if either wing be left so as to project at an angle to its substantially normal position, the spring 23 will retract it, when released, into position to be forced into locking engagement with the spring latch of clip 17.

I have illustrated and described the preferred embodiment of the invention but changes may be made therein without departing from its essential features.

The manner of attaching the bumper to the car or truck may be changed to meet the requirements of the particular make or type of car to which attached.

Having described my invention and set forth its merits what I claim is:

1. A bumper including a wing swiveled to swing in two different planes to adapt it to be moved out of interlocked engagement with the bumper of another vehicle.

2. A bumper including a wing swiveled to swing in two different planes to adapt it to be moved out of interlocking engagement with the bumper of another vehicle, and a releasable catch to hold the wing in normal position.

3. A bumper including a wing supported at one end by a hinge permitting it to swing in a horizontal plane and pivotally connected to a part of the hinge to swing in a vertical plane, the wing formed to contact with a part of the hinge to limit its vertical swing.

4. A bumper including a wing swiveled to swing in two different planes and having a portion thereof formed into a tongue spaced from the body portion of the wing, and a latch for supporting the wing in normal position and releasably engaged with the tongue to permit the wing to swing in both a horizontal and a vertical plane upon release of the wing from the latch.

5. A bumper including a wing having a portion thereof formed into a tongue spaced from the body portion of the wing, a hinge connected with one end of the wing to permit the wing to swing in a horizontal plane, a pivotal connection between the hinge and wing to adapt the wing to swing in a vertical plane, and a latch releasably connected with a part of the wing to support the wing in normal position and upon release permitting the wing to swing in two different planes.

6. A bumper including a swinging wing, means for supporting the bumper from a car frame, a hinge connecting the wing and the bumper supporting means and permitting the wing to swing in a predetermined plane, and a pivot connecting the wing with one leaf of the hinge to permit the wing to swing in another plane, and means for releasably supporting the wing in its normal position.

7. A bumper including a swinging wing, means for supporting the bumper from a car frame, a hinge connecting the wing and the bumper supporting means and adapting the wing to swing in a horizontal plane, one end of the wing fitting between oppositely disposed cheeks of one leaf of the hinge, a pintle pivotally connecting the wing to one leaf of the hinge to permit the wing to swing in a vertical plane, a collar encircling the pintle between the cheeks of said leaf and fitting in an opening in the end of the wing, and means for releasably supporting the wing in normal position.

8. A bumper including a wing, a bar supporting the bumper from a car frame, a hinge to which the wing is connected and comprising oppositely disposed leaves, a spacing member between the leaves of the spring and formed with lips spanning one leaf of the hinge and having their ends projected towards each other and shaped to form inclined outer faces.

In testimony whereof I affix my signature.

RICHARD REYNOLDS.